Oct. 21, 1952      E. D. DITTO      2,614,459
OPHTHALMIC MOUNTING
Filed June 17, 1948      2 SHEETS—SHEET 1
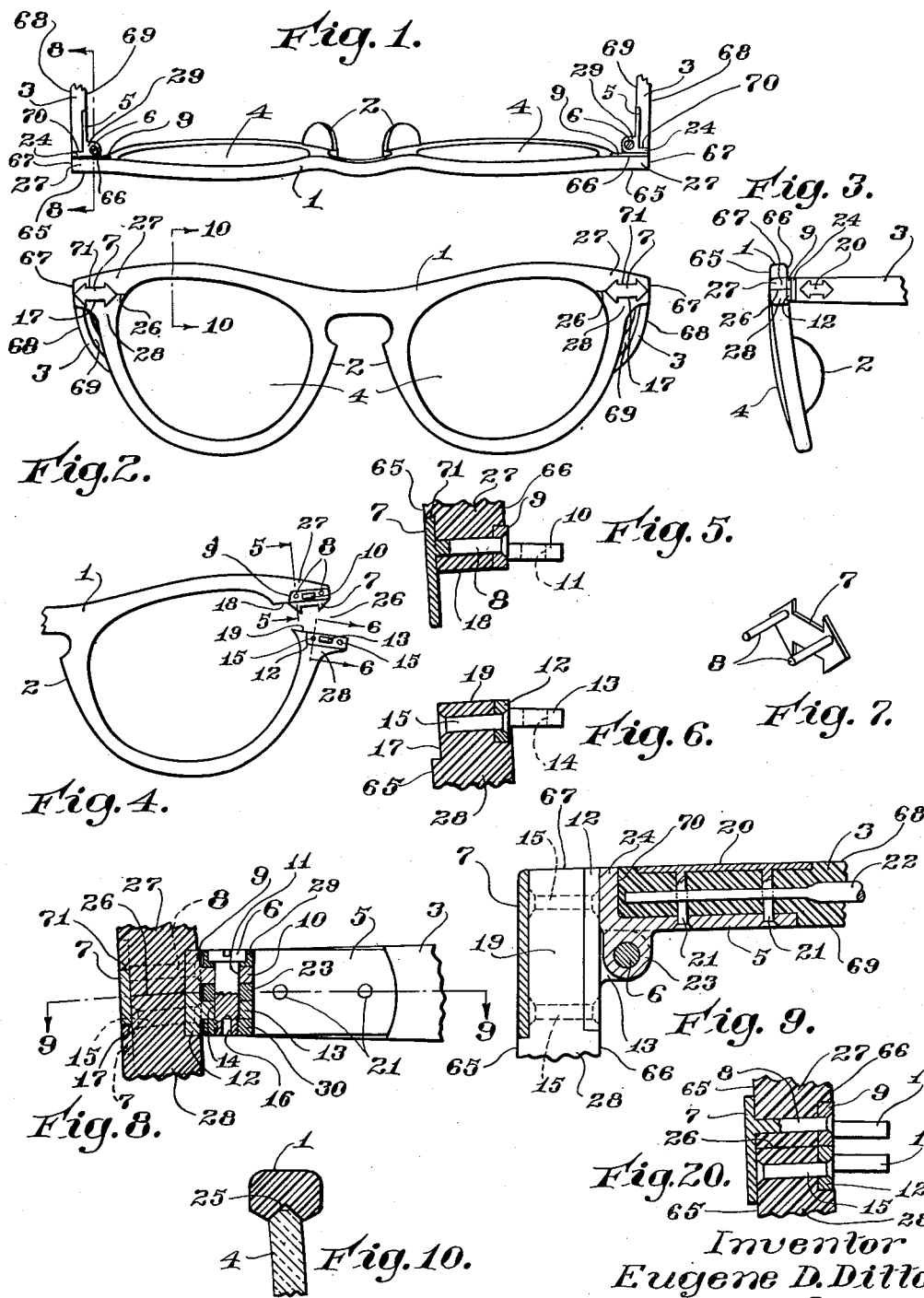
Inventor
Eugene D. Ditto
by David Rines
Attorney Oct. 21, 1952     E. D. DITTO     2,614,459
OPHTHALMIC MOUNTING
Filed June 17, 1948     2 SHEETS—SHEET 2
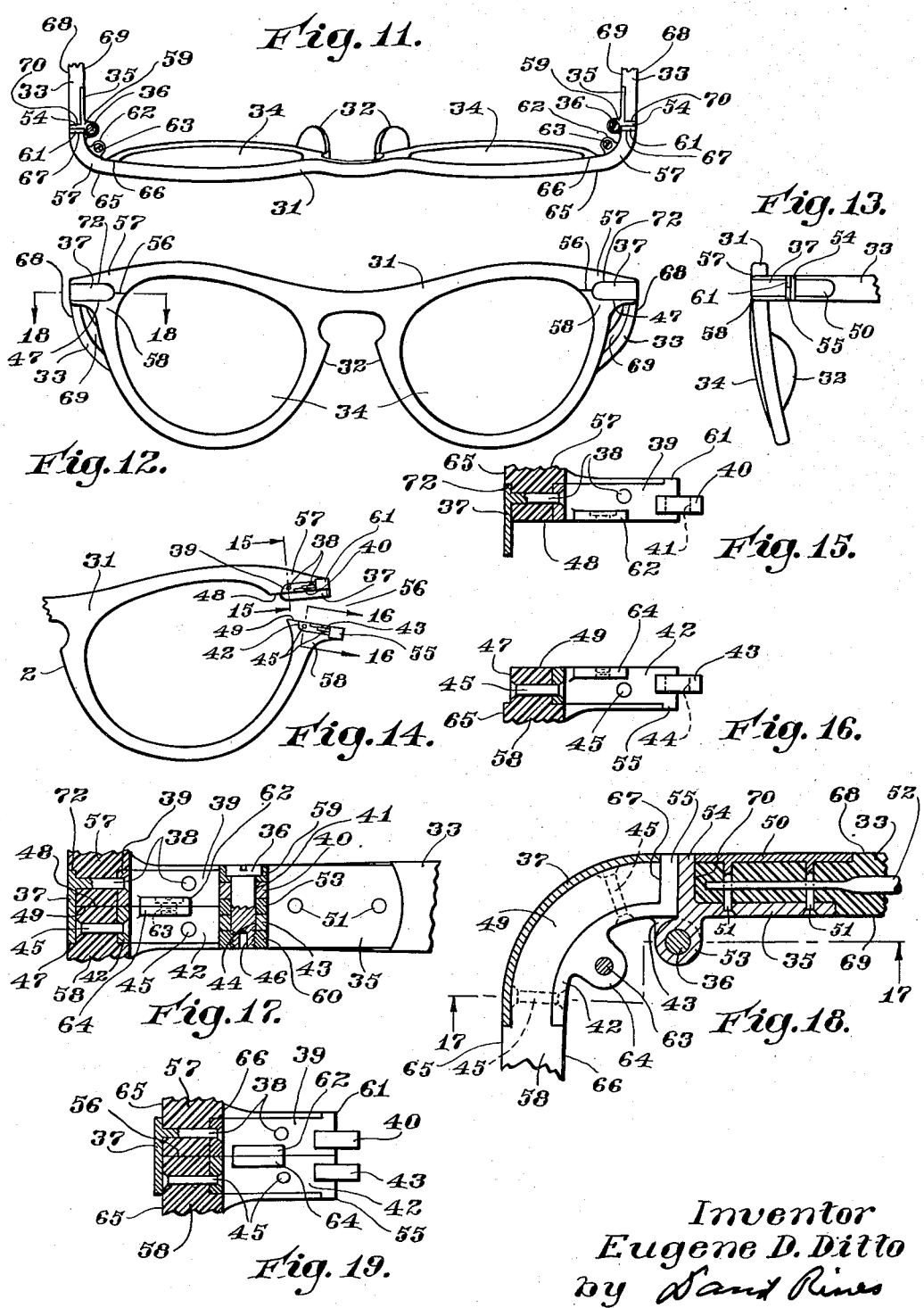
Inventor
Eugene D. Ditto
by David Rines
Attorney Patented Oct. 21, 1952

2,614,459

UNITED STATES PATENT OFFICE 2,614,459

OPHTHALMIC MOUNTING

Eugene D. Ditto, Brookline, Mass., assignor, by mesne assignments, to Marine Optical Manufacturing Co., a corporation of Massachusetts Application June 17, 1948, Serial No. 33,553

18 Claims. (Cl. 88—41)

The present invention relates to ophthalmic mountings comprising non-metal lens-holding rims, and more particularly to mountings of the all-"shell" type, constituted of non-metal plastic material, like "Celluloid," "Zylonite" and the like.

The lens-holding rims of mountings of this type have usually been endless or continuous. As the non-metal material, though more or less flexible or resilient, is not sufficiently so to permit mounting lenses within the endless rims at ordinary temperatures, it has been necessary to apply heat in order to permit of stretching or expanding the rims for the purpose of increasing temporarily their calibre. The lenses have been inserted into the lens-holding grooves of the endless rims while stretched, after which the non-metal material has been allowed to shrink back to its normal size at ordinary temperatures. These procedures have constituted a drawback for, besides the inconvenience attendant upon the heat application, and the dulling of the finish of the plastic caused by the heat, the mounting has many times become distorted, in consequence. Frequently, indeed, the non-metal material has cracked, following upon the shrinking process.

Endless or continuous non-metal rims have accordingly heretofore been proposed, so constructed as to permit lenses to be inserted within them without making it necessary previously to expand or stretch the non-metal material by heat. These have not, however, found commercial favor.

Opthalmic mountings of the part-rim or semi-frame type have therefore also been proposed, in which portions of the mountings are cut away. Because of this cutting away, the insertion of the lenses becomes possible without the necessity for applying heat to expand or stretch the rims. As parts of the lenses of these part-rim or semi-frame mountings are consequently without rim support, however, it is difficult to hold the lenses in place. To meet this difficulty, wire or other part-rim or other supports have been provided additional to the semi-frames, but these have involved complexities of construction.

Other proposals have been to split the non-metal rims, but these have required that suitable mechanism be provided for holding the ends of the split rims together. Some of these proposals have involved securing oppositely disposed metal plates to the ends of split rims, one metal plate upon each of these ends. As the metal plates become thus mounted between the ends of the rims, they are quite conspicuous, so that they necessarily proclaim to all observers the fact that the rims are actually split. Other split-rim proposals, not subject to this objection, have succeeded in concealing the splits in the rims but, on the other hand, they have been clumsy and unsightly in appearance for other reasons.

It is accordingly an object of the present invention to provide non-metal ophthalmic mountings of the split-rim type with new and improved means for holding the ends of the split rims together.

Another object is to provide new and improved means for concealing the ends of the split rims of mountings of the above-described character.

A further object is to provide a better joint at the ends of the split rims.

With the above and other objects in view, the invention consists more particularly of the improved ophthalmic mounting hereinafter described, illustrated in the accompanying drawings, and defined in the appended claims.

The invention will now be more fully described in connection with the accompanying drawings, in which Fig. 1 is a plan of an ophthalmic mounting constructed according to a preferred embodiment of the present invention, showing fragments of the temples; Fig. 2 is a front elevation of the same; Figs. 3 and 4 are respectively fragmentary side and rear views of the same; Figs. 5 and 6 are sections, upon a larger scale, taken respectively upon the lines 5—5 and 6—6 of Fig. 4, looking in the directions of the respective arrows; Fig. 7 is a perspective, upon a larger scale, of a rivet-pin-carrying split-concealing metal member; Fig. 8 is an enlarged section similar to the sections of Figs. 5 and 6, taken upon the line 8—8 of Fig. 1, looking in the direction of the arrows; Fig. 9 is a section taken upon the line 9—9 of Fig. 8, looking in the direction of the arrows; Fig. 10 is a section, upon a similarly enlarged scale, taken upon the line 10—10 of Fig. 2, looking in the direction of the arrows; Figs. 11, 12, 13 and 14 are views similar to Figs. 1, 2, 3 and 4, respectively, of a modification; Figs. 15 and 16 are sections similar to Figs. 5 and 6, respectively, taken respectively upon the lines 15—15 and 16—16 of Fig. 14, looking in the directions of the respective arrows; Fig. 17 is a section similar to Fig. 8, taken upon the line 17—17 of Fig. 18, looking in the direction of the arrows; Fig. 18 is a section similar to Fig. 9, taken upon the line 18—18 of Fig. 12, looking in the direction of the arrows; Fig. 19 is a section similar to the sections of Figs. 15 and 16, but with the end pieces assembled; and Fig. 20 is similarly a section similar to the sections of Figs. 5 and 6, but with the end pieces assembled.

The ophthalmic mounting of the present invention comprises a non-metal front 1 or 31 and a pair of non-metal temples 3 or 33. The non-metal material may be constituted of the nitro-cellulose products known as "Zylonite" or "Celluloid," a compound of pyroxylin, camphor and alcohol. It may, however, be constituted also of any other suitable plastic, such as nylon plastic, or a plasticized vinyl resin polymer obtained, for example, by polymerizing one or more vinyl derivatives. The non-metal front 1 or 31 may be formed out of sheet material, or it may be manufactured in other ways, as by molding. For molding, cellulose acetate may be employed, though this material may be used in sheet form also.

The front 1 or 31 comprises a unitary bridge member and two lens-holding rims, each provided with a lens-receiving groove 25 for receiving a lens 4 or 34. Each lens-holding rim is shown comprising a depending arm provided at its lower end with a rearwardly extending nose guard 2 or 32.

In order to permit of inserting the lens 4 or 34 without heating the lens-holding rims, each lens-holding rim of the front 1 is split at 26 to provide a pair of end pieces 27 and 28 of substantially the same length, and each lens-holding rim of the front 31 is split at 56 to provide a pair of end pieces 57 and 58 of substantially the same length. As non-metal material of the kind described above is flexible, it is possible to open the lens-holding rims at their splits 26 and 56. The end pieces 27 and 28 are provided at the split 26 with oppositely disposed faces 18 and 19 of substantially the same length as the length of the end pieces 27 and 28, and the end pieces 57 and 58 at the split 56 with oppositely disposed faces 48 and 49 of substantially the same length as the length of the end pieces 57 and 58.

Though the lens-holding rims are shown slightly bowed out, so as to present a slightly convex appearance at the front, it will be convenient to speak of them as substantially planar. With this understanding, each pair of end pieces 27 and 28, shown flat, may be regarded as disposed in the plane of their lens-holding rim. The end pieces 57 and 58, on the other hand, are shown curved rearward, out of the plane of their rims 34, and also downward at a suitable incline. The rearward curves of the end pieces 57 and 58 may be produced by suitable bending under pressure and heat.

Each of the end pieces 27, 28, 57 and 58 is provided with a front face 65, a rear face 66 and a flat end face 67. The front face 65 and the rear face 66 of the end piece 27 are connected by the face 18, the front face 65 and the rear face 66 of the end piece 28 are connected by the face 19, the front face 65 and the rear face 66 of the end piece 57 are connected by the face 48, and the front face 65 and the rear face 66 of the end piece 58 are connected by the face 49. Each temple 3 or 33 is provided with a front face 68, a rear face 69 and an end face 70, respectively corresponding to the front face 65, the rear face 66 and the end face 67 of each of the end pieces 27, 28, 57 and 58.

Two metal hinges are provided respectively corresponding to the two lens-holding rims of each front 1 or 31 for respectively connecting pivotally the temples 3 or 33 to the corresponding lens-holding rims through the medium of the pair of end pieces 27 and 28 or 57 and 58, respectively. Each hinge is shown comprising three metal hinge members and a metal hinge pintle 6 or 36 about which they are pivoted.

One of these three hinge members pivoted about the hinge pintle 6 or 36 comprises an L-shaped metal member mounted upon the temple 3 or 33. The long arm 5 or 35 of each of these L-shaped members is shown flat, and set into a correspondingly shaped rabbeted flat recess in the rear face 69 of each temple 3 or 33 respectively, and the short arm 24 or 54 of each of these L-shaped members, also shown flat, is disposed adjacent to and in contact with the end face 70 of each temple 3 or 33, respectively.

A second of the three hinge members pivoted about the hinge pintle 6 or 36 comprises a metal plate 9 or 39, 61, respectively mounted upon the rear face 66 of the end piece 27 or 57, respectively, with its lower end adjacent to and alined or flush with the connecting faces 18 and 48, respectively. The third of the three hinge members comprises a metal plate 12 or 42, 55, respectively mounted upon the rear face 66 of the end piece 28 or 58, respectively, with its upper end adjacent to and alined or flush with the connecting faces 19 and 49, respectively.

According to the preferred embodiment of the present invention, illustrated in Figs. 1 to 10, the metal plates 9 and 12 are flat, and they are shown at least partly set into correspondingly shaped rabbeted flat alined recesses in the rear faces 66 of the respective flat end pieces 27 and 28. As clearly shown, the metal plates 9 and 12 are not mounted upon the oppositely disposed connecting faces 18 and 19, respectively, of the end pieces 27 and 28. They are mounted upon the rear faces 66 only of the end pieces 27 and 28. The oppositely disposed connecting faces 18 and 19 will therefore come into direct contact when, after a lens 4 has been inserted into the lens-holding rim, the end pieces 27 and 28 are brought together.

According to the modification illustrated in Figs. 11 to 18, on the other hand, the metal members, 39, 61 and 42, 55 mounted upon the curved end pieces 57 and 58 are L-shaped. The larger arms 39 and 42 of these L's, curved to conform to the curves of the curved end pieces 57 and 58, are shown set into correspondingly shaped rabbeted curved alined recesses in the rear faces 66 of the respective curved end pieces 57 and 58. The shorter arms 61 and 55 of the respective L's are flat, and they are shown disposed adjacent to and in contact with the respective end faces 67 of the end pieces 57 and 58. The L-shaped metal members 39, 61 and 42, 55 are clearly shown not mounted upon the oppositely disposed connecting faces 48 and 49, respectively, of the end pieces 57 and 58. They are mounted upon the rear faces 66 only of the end pieces 52 and 58. The oppositely disposed connecting faces 48 and 49, like the oppositely disposed connecting faces 18 and 19, will therefore come into direct contact when, after a lens 34 has been inserted into the lens-holding rim, the end pieces 57 and 58 are brought together.

The short flat metal arms 24 of the L-shaped metal hinge plates 5, 24 mounted on the temples 3 abut and engage against the flat metal hinge plates 9 and 12, respectively mounted upon the flat end pieces 27 and 28, in the illustrated open positions of the temples 3. The flat metal short arms 54 of the L-shaped metal hinge plates 35, 54 mounted on the temples 33 will similarly abut and engage against the flat metal short arms 61 and 55, respectively, of the L-shaped metal hinge plates 39, 61 and 42, 55, respectively mounted upon the curved end pieces 57 and 58, in the illustrated open positions of the temples 33.

The two flat metal hinge plates 9 and 12, respectively mounted upon the end pieces 27 and 28 of the front 1, are shown integrally provided with respective ears 10 and 13, respectively provided with smooth cylindrical apertures 11 and 14. The L-shaped metal hinge plate 5, 24, mounted upon the temple 3, is similarly shown integrally provided with three alined cylindrically apertured ears 29, 23 and 30. The temples 3 are swingably mounted upon the front 1 by inserting the ear 10 of the metal hinge plate 9 between the middle ear 23 and the end ear 29 of the metal hinge member 5, 24, and the ear 13 of the metal hinge plate 12 between the middle ear 23 and the other end ear 30 of the metal hinge plate 5, 24, and then inserting the hinge pintle 6 into the apertures of the alined ears 29, 10, 23, 13 and 30. The apertures of the ears 29 and 23, like the apertures 11 and 14 of the respective ears 10 and 13, are smooth, but the aperture of the ear 30 is screw-threaded to receive screw threads upon the free end of the hinge pintle 6. The opposite end of the hinge pintle 6 is provided with a cylindrical enlarged head that becomes seated in a correspondingly shaped countersunk recess in the ear 29. Not only does the hinge pintle 6 serve as a pivot about which the temple 3 may swing, therefore, but it also cooperates with the hinge plates 5, 9 and 12 to hold the end pieces 27 and 28 together, with the oppositely disposed connecting faces 18 and 19 of the respective end pieces 27 and 28 adjacent to and in contact with each other along the split 26. To prevent the lens-holding rim becoming accidentally opened at the split 26, the threaded end of the hinge pintle 6 may be provided with an aperture 16 the wall of which may be expanded or swaged radially outward into tight engagement with the screw-threaded wall of the aperture in the ear 30, as described in Letters Patent 2,036,550, issued April 7, 1936, to Frederick A. Stevens.

The temples 33 are swingably mounted upon the end pieces 57 and 58 of the front 31 in similar fashion. Corresponding to the apertured ears 10 and 13, the metal hinge members 39, 61 and 42, 55, respectively mounted upon the end pieces 57 and 58, are integrally provided with respective ears 40 and 43, respectively provided with smooth cylindrical apertures 41 and 44. The ears 40 and 43 are respectively inserted between the middle apertured ear 53 and the end apertured ear 59 and between the middle apertured ear 53 and the end threadedly apertured ear 60 of the metal hinge member 35, 54 that is mounted upon the temple 33. The hinge pintle 36, like the hinge pintle 6, is provided with an enlarged cylindrical head that is seated in a correspondingly shaped countersink of the ear 59 and with a threaded end, threaded into the threads of the threaded aperture in the ear 60. Not only does the hinge pintle 36, like the hinge pintle 6, therefore, serve as a pivot about which the temple 33 may swing, but it similarly cooperates with the hinge member 35, 54, the hinge member 39, 61 and the hinge member 42, 55 to hold the end pieces 57 and 58 together, with the oppositely disposed connecting faces 48 and 49 of the respective end pieces 57 and 58 adjacent to and in contact with each other along the split 56. To prevent the lens-holding rim becoming accidentally opened at the split 56, the threaded end of the hinge pintle 36 may be provided with an aperture 46, and the walls of the aperture 46 may be swaged into tight engagement with the threads in the screw-threaded aperture of the ear 60, similarly to the swaging of the walls of the aperture 16 into tight engagement with the threads of the threaded aperture of the ear 30.

In view of the fact that the long arms 39 and 42 of the L-shaped curved hinge members 39, 61 and 42, 55 are longer than the flat metal hinge plates 9 and 12, it is preferred to supplement the action of the hinge pintle 36, in holding the end pieces 57 and 58 together, with further holding action provided by two additional apertured ears 62 and 64, respectively provided upon the long arms 39 and 42 of the metal L-shaped hinge members 39, 61 and 42, 55, and held together by a screw 63. The screws 63 are shown as of the same nature as the hinge pintles 6 and 36, though shorter, in that they are provided with enlarged cylindrical heads seated in countersunk recesses of the ears 62 and threaded free ends threaded in threaded walls of the apertures of the ears 64. The screws 63 may also, if desired, be provided with apertures like the apertures 16 and 46 for swaging into the walls of the threaded apertures in the ears 64. The ears 62 and 64 are shown disposed intermediately between the hinge pintle 36 and the free ends of the long arms 39 and 42, respectively, of the hinge members 39, 61 and 42, 55.

It is now in order to describe how the hinge members are secured to the end pieces 27 and 28, and 57 and 58, respectively, of the respective fronts 1 and 31 and to the temples 33, and how the splits 26 and 56 between the end pieces 27 and 28 and the end pieces 57 and 58, respectively, are concealed.

For a purpose that will presently appear, each end piece 28 is provided in its front face 65 with a rabbeted flat recess 17 extending to the connecting face 19, and each end piece 58 is similarly provided on its front face 65 with a rabbeted flat recess 47 extending to the connecting face 49. The hinge plates 12 are fixed in their flat rabbeted recesses on the rear faces 66 of their end pieces 28 by rivets 15 that extend from the walls of the recesses 17 through the non-metal material of the end pieces 28 into openings in the hinge plates 12. The hinge members 42, 55 are similarly fixed in their curved rabbeted recesses on the rear faces 66 of their end pieces 58 by rivets 45 that extend from the walls of the recesses 47 through the non-metal material of the end pieces 58 into openings in the longer arms 42 of the hinge members 42, 55.

The hinge plates 9 are fixed in their flat rabbeted recesses on the rear faces of their end pieces 27 by rivet pins 8 integrally projecting from the rear faces of flat metal members 7 through the non-metal material of the end pieces 27 into openings in the hinge plates 9. The hinge members 39, 61 are similarly fixed in their curved rabbeted recesses on the rear faces 66 of their end pieces 57 by rivet pins 38 integrally projecting from the rear faces of correspondingly curved metal members 37 through the non-metal material of the end pieces 57 into openings in the longer arms 39 of the hinge members 39, 61. The flat members 7 are set into correspondingly shaped rabbeted flat recesses 71 in the front faces 65 of the flat end pieces 27, and the curved metal members 37 are similarly set into correspondingly shaped rabbeted curved recesses 72 in the front faces 65 of the curved end pieces 57. The recesses 71 in the end piece 27 are alined with the recesses 17 in the end pieces 28 and the recesses 72 in the end pieces 57 are alined with the recesses 47 in the end pieces 58.

The lower portions of the metal members 7 project below the connecting faces 18 of the end pieces 27 and the lower portions of the metal member 37 project below the connecting faces 48 of the end pieces 57. When the connecting faces 18 and 19 of the respective end pieces 27 and 28 are brought into contact, therefore, and secured in place by the hinge pintles 6, the lower portions of the metal members 7 project into the recesses 17 of the corresponding end pieces 28 so as to conceal the splits 26 and also the rivets 15 from the front where the end pieces 27 and 28 are held together. When the connecting faces 48 and 49 of the respective end pieces 57 and 58 are similarly brought into contact and secured in place by the hinge pintles 36, the lower portions of the metal members 37 project similarly into the recess 47 of the corresponding end pieces 58 so as to conceal the splits 56 and also the rivets 45 from the front when the end pieces 57 and 58 are held together.

Rivet pins 21, integral with metal members 20, similar to the members 7, are shown extending through the non-metal material of the temples 3, as well as through reinforcing rods 22 therefor, and into openings of the long arms 5 of the L-shaped members 5, 24 to secure these L-shaped members to the temples 3. Metal member 50, also similar to the metal members 7, are integrally provided with rivet pins 51 extending through the non-metal material of the temples 37, as well as through reinforcing rods 52 therefor, and into openings of the long arms 35 of the L-shaped members 5, 54 to secure these L-shaped members to the temples 33.

According to the present invention, therefore, a very simply constructed non-metal ophthalmic mounting is provided with split lens-holding rims the oppositely disposed connecting faces 18 and 19 of the end pieces 27 and 28 of which, or the oppositely disposed connecting faces 48 and 49 of the end pieces 57 and 58 of which, are maintained in contact without the aid of interposed metal hinge plates and the splits 26 or 56 of which are nevertheless concealed by the concealing members 7 and 38 to improve the appearance.

According to the modifications illustrated in Figs. 19 and 20, the end pieces 57 and 58 are not provided with the respective recesses 72 and 47 and the end pieces 27 and 78 are similarly not provided with the respective recesses 71 and 17. The rivets 45 and 15 that secure the respective hinge members 42, 55 and 12 in their respective rabbeted recesses on the rear faces 66 of the respective end pieces 58 and 28 therefore extend through the non-metal material of the respective end pieces to the front faces 65 thereof and the metal members 37 and 7 contact with the front faces 65 of the end pieces 57 and 58 and the end pieces 27 and 28, respectively, so as to project forward beyond these front faces 65, instead of being flush therewith.

In order to enhance the appearance, the metal members 7 and 37 upon the respective fronts 1 and 31 may have a pleasing design. The member 7, for example, is shown shaped as a double arrow, with the spearheads of the arrows pointed away from each other. The metal member 20 upon the temple 3 is shown of the same shape as the member 7, and the member 50 may similarly conform in shape to the shape of the member 37. The recesses 17, 47, and 71 and 72 are shaped to correspond to the shape of the respective metal members 7 and 37. Further to enhance the appearance, the metal members 7 are shown extending to the free ends of the end pieces 27 and 28. For a similar reason, the metal members 37 are shown contacting with the short arms 55 and 61 of the L-shaped members 42, 55 and 39, 61, and the metal members 50 are shown contacting with the short arms 54 of the L-shaped members 35, 54.

Further modifications will occur to persons skilled in the art and all such are considered to fall within the spirit and scope of the invention as defined in the appended claims.

What is claimed is:

1. An ophthalmic mounting comprising a split lens-holding flexible member having front and rear faces and the ends of which are of substantially the same length and provided with oppositely disposed connecting faces of substantially the said same length, a second member having front and rear faces, and a hinge pivotally connecting the members comprising three hinge members and a hinge pintle about which the hinge members are pivoted, two of the three hinge members being respectively mounted upon the rear faces only of the ends of the lens-holding member adjacent to the respective oppositely disposed connecting faces, the third hinge member being mounted upon the rear face of the second member, and the hinge pintle and the hinge members cooperating to hold the ends of the lens-holding member together with the oppositely disposed connecting faces in contact with each other and to hold the second member to the lens-holding member.

2. An ophthalmic mounting comprising a split lens-holding member of flexible non-metal material having front and rear faces and the ends of which are of substantially the same length and provided with oppositely disposed connecting faces of substantially the said same length, a second member having front and rear faces, a hinge pivotally connecting the members comprising three hinge members and a hinge pintle about which the hinge members are pivoted, two of the hinge members being respectively mounted upon the rear faces only of the ends of the lens-holding member adjacent to the respective oppositely disposed connecting faces, the third hinge member being mounted upon the rear face of the second member, the hinge pintle and the hinge members cooperating to hold the ends of the lens-holding member together with the oppositely disposed connecting faces in contact with each other and to hold the second member to the lens-holding member, and means secured to the front face of one of the ends of the lens-holding member and projecting beyond its connecting face in front of the other end of the lens-holding member to conceal the split in the rim from the front when the ends of the lens-holding member are held together.

3. An ophthalmic mounting comprising a split lens-holding member of flexible non-metal material having front and rear faces and the ends of which are of substantially the same length and provided with oppositely disposed connecting faces of substantially the said same length, a second member having front and rear faces, a hinge pivotally connecting the members comprising three hinge members and a hinge pintle about which the hinge members are pivoted, two of the hinge members being respectively mounted upon the rear faces only of the ends of the lens-holding member adjacent to the respective oppositely disposed connecting faces, the third hinge member being mounted upon the rear face of the second member, a concealing member secured to the front face of one of the ends of the lens-holding member projecting beyond its connecting face and integrally provided with a pin extending through the said one end of the lens-holding member and into the hinge member mounted thereon to secure the said hinge member to the rear face of the said one end of the lens-holding member, means securing to the rear face of the other end of the lens-holding member the hinge member mounted thereon, and means securing the third hinge member to the rear face of the second member, the hinge pintle and the hinge members cooperating to hold the ends of the lens-holding member together with the oppositely disposed connecting faces in contact with each other and with the concealing member concealing the split in the lens-holding member from the front when the ends of the lens-holding member are held together and to hold the second member to the lens-holding member.

4. An ophthalmic mounting comprising a split lens-holding rim of flexible non-metal material having front and rear faces and the ends of which are of substantially the same length and provided with oppositely disposed connecting faces of substantially the said same length, a temple having front and rear faces, and a hinge pivotally connecting the lens-holding rim and the temple comprising three hinge members and a hinge pintle about which the hinge members are pivoted, two of the hinge members being respectively mounted upon the rear faces only of the ends of the lens-holding rim adjacent to the respective oppositely disposed connecting faces, the third hinge member being mounted upon the rear face of the temple, and the ophthalmic mounting being provided with means for holding the ends of the lens-holding rim together with the oppositely disposed connecting faces in contact with each other.

5. An ophthalmic mounting comprising a split lens-holding rim of flexible non-metal material having front and rear faces and the ends of which are of substantially the same length and provided with oppositely disposed connecting faces of substantially the said same length, a temple having front and rear faces, and a hinge pivotally connecting the lens-holding rim and the temple comprising three hinge members and a hingle pintle about which the hinge members are pivoted, one of the hinge members being mounted upon the rear face of the temple and being provided with three alined apertured ears, the other two of the hinge members being respectively mounted upon the rear faces only of the ends of the lens-holding rim adjacent to the respective oppositely disposed connecting faces and being respectively provided with apertured ears respectively inserted between the middle and the end ears of the three alined ears, and the hinge pintle extending through the apertures in the ears to cooperate with the hinge members in order to hold the ends of the lens-holding rim together with the oppositely disposed connecting faces in contact with each other and to hold the temple to the lens-holding rim.

6. An ophthalmic mounting comprising a split lens-holding rim of flexible non-metal material having front and rear faces and the ends of which are of substantially the same length and provided with oppositely disposed connecting faces of substantially the said same length, a temple having front and rear faces, and a hinge pivotally connecting the lens-holding rim and the temple comprising three hinge members and a hinge pintle about which the hinge members are pivoted, one of the hinge members being mounted upon the rear face of the temple and being provided with three alined apertured ears, the other two of the hinge members being respectively mounted upon the rear faces only of the ends of the lens-holding rim adjacent to the respective oppositely disposed connecting faces and being respectively provided with apertured ears respectively inserted between the middle and the end ears of the three alined ears, one of the end ears being provided with a countersunk recess and the aperture of the other end ear being threaded, the hinge pintle being provided with a threaded end threaded in the aperture of the threaded ear and an enlarged head seated in the countersunk recess, and the threaded end of the pintle being provided with an aperture the wall of which is swaged into contact with the threaded wall of the threaded aperture.

7. An ophthalmic mounting comprising a split flexible lens-holding rim having front and rear faces and the ends of which are of substantially the same length and provided with oppositely disposed connecting faces of substantially the said same length, a temple having front and rear faces, and a hinge pivotally connecting the lens-holding rim and the temple comprising three hinge members and hinge pintle about which the hinge members are pivoted, two of the hinge members being respectively mounted upon the rear faces only of the ends of the lens-holding rim adjacent to the respective opposely disposed connecting faces, the third hinge member being mounted upon the rear face of the temple, and the hinge pintle and the hinge members cooperating to hold the ends of the lens-holding rim together with the oppositely disposed connecting faces in contact with each other and to hold the temple to the lens-holding rim.

8. An ophthalmic mounting comprising a split lens-holding rim of flexible non-metal material having front and rear faces and the ends of which are of substantially the same length and provided with oppositely disposed connecting faces of substantially the said same length, a temple having front and rear faces, a hinge pivotally connecting the lens-holding rim and the temple comprising three hinge members and a hinge pintle about which the hinge members are pivoted, two of the hinge members being respectively mounted upon the rear faces only of the ends of the lens-holding rim adjacent to the respective oppositely disposed connecting faces, the third hinge member being mounted upon the rear face of the temple, a concealing member secured to the front face of one of the ends of the lens-holding rim projecting beyond its connecting face and integrally provided with a pin extending through the said one end of the lens-holding rim and into the hinge member mounted thereon to secure the said hinge member to the rear face of the said one end of the lens-holding rim, means securing to the rear face of the other end of the lens-holding rim the hinge member mounted thereon, and means securing the third hinge member to the rear face of the temple, the hinge pintle and the hinge members cooperating to hold the ends of the lens-holding rim together with the oppositely disposed connecting faces in contact with each other and with the concealing member concealing the split in the lens-holding rim from the front when the ends of the lens-holding rim are held together and to hold the temple to the lens-holding rim.

9. An ophthalmic mounting comprising a split lens-holding rim of flexible non-metal material having front and rear faces and the ends of which are of substantially the same length and respectively provided with end pieces having oppositely disposed connecting faces of substantially the said same length, the rear faces being provided with alined recesses L-shaped in cross-section respectively adjacent to the oppositely disposed connecting faces, a temple having a front face and a rear face provided with a recess L-shaped in cross-section near its end, a hinge pivotally connecting the lens-holding rim and the temple comprising three hinge members and a hinge pintle about which the hinge members are pivoted, two of the hinge members being respectively mounted in the recesses only of the end pieces adjacent to and flush with the respective oppositely disposed connecting faces, the third hinge member being mounted in the recess of the temple, and the hinge pintle and the hinge members cooperating to hold the end pieces together with the oppositely disposed connecting faces in contact with each other and to hold the temple to the lens-holding rim.

10. An ophthalmic mounting comprising a split lens-holding rim of flexible non-metal material having front and rear faces and the ends of which are of substantially the same length and respectively provided with end pieces having oppositely disposed connecting faces of substantially the said same length, a temple having front and rear faces, a hinge pivotally connecting the lens-holding rim and the temple comprising three hinge members and a hinge pintle about which the hinge members are pivoted, two of the hinge members being respectively mounted upon the rear faces only of the end pieces adjacent to the respective oppositely disposed connecting faces, the third hinge member being mounted upon the rear face of the temple, a concealing member secured to the front face of one of the end pieces projecting beyond its connecting face and integrally provided with a pin extending through the said one end piece and into the hinge member mounted thereon to secure the said hinge member to the rear face of the said one end piece, means securing to the rear face of the other end piece the hinge member mounted thereon, and means securing the third hinge member to the rear face of the temple, the hinge pintle and the hinge members cooperating to hold the end pieces together with the oppositely disposed connecting faces in contact with each other and with the concealing member concealing the split in the lens-holding rim from the front when the end pieces are held together and to hold the temple to the lens-holding rim.

11. An ophthalmic mounting comprising a split lens-holding rim of flexible non-metal material having front and rear faces and the ends of which are of substantially the same length and respectively provided with end pieces having oppositely disposed connecting faces of substantially the said same length, the front faces being provided with aligned recesses L-shaped in cross-section respectively adjacent to the oppositely disposed connecting faces, the rear faces being also provided with alined recesses L-shaped in cross-section respectively adjacent to the oppositely disposed connecting faces, a temple having a front face and a rear face provided with a recess L-shaped in cross-section near its end, a hinge pivotally connecting the lens-holding rim and the temple comprising three hinge members and a hinge pintle about which the hinge members are pivoted, two of the hinge members being respectively mounted in the recesses only in the rear faces of the end pieces adjacent to and flush with the respective oppositely disposed connecting faces, the third hinge member being mounted in the recess of the temple, and a concealing member mounted in the recess in the front face of one of the end pieces projecting beyond the connecting face of the said one end piece, the hinge pintle and the hinge members cooperating to hold the end pieces together with the oppositely disposed connecting faces in contact with each other and with the concealing member projecting into the recess in the front face of the other end piece to conceal the split in the lens-holding rim from the front when the end pieces are held together and to hold the temple to the lens-holding rim.

12. An ophthalmic mounting comprising a substantially planar split lens-holding rim of flexible non-metal material having front and rear faces and the ends of which are of substantially the same length and respectively provided with end pieces substantially in the plane of the rim having oppositely disposed connecting faces of substantially the said same length, a temple having front and rear faces, a hinge pivotally connecting the lens-holding rim and the temple comprising three hinge members and a hinge pintle about which the hinge members are pivoted, two of the hinge members being respectively mounted upon the rear faces only of the end pieces adjacent to the respective oppositely disposed faces, the third hinge member being mounted upon the rear face of the temple, a concealing member secured to the front face of one of the end pieces projecting beyond its connecting face and integrally provided with a pin extending through the said one end piece and into the hinge member mounted thereon to secure the said hinge member to the rear face of the said one end piece, means securing to the rear face of the other end piece the hinge member mounted thereon, and means securing the third hinge member to the rear face of the temple, the hinge pintle and the hinge members cooperating to hold the end pieces together with the oppositely disposed connecting faces in contact with each other and with the concealing member concealing the split in the lens-holding rim from the front when the end pieces are held together and to hold the temple to the lens-holding rim.

13. An opthalmic mounting comprising a split lens-holding rim of flexible non-metal material having front and rear faces and the ends of which are respectively provided with rearwardly curved end pieces having oppositely disposed connecting faces, a temple having front and rear faces, a hinge pivotally connecting the lens-holding rim and the temple comprising three hinge members and a hinge pintle about which the hinge members are pivoted, two of the hinge members being respectively mounted upon the rear faces only of the end pieces adjacent to the respective oppositely disposed faces, the third hinge member being mounted upon the rear face of the temple, a concealing member secured to the front face of one of the end pieces curved to conform to the curve thereof projecting beyond its connecting face and integrally provided with a pin extending through the said one end piece and into the hinge member mounted thereon to secure the said hinge member to the rear face of said one end piece, means securing to the rear face of the other end piece the hinge member mounted thereon, and means securing the third hinge member to the rear face of the temple, the hinge pintle and the hinge members cooperating to hold the end pieces together with the oppositely disposed connecting faces in contact with each other and with the concealing member concealing the split in the lens-holding rim from the front when the end pieces are held together and to hold the temple to the lens-holding rim.

14. An ophthalmic mounting comprising a front and a pair of temples each having front and rear faces, the front having a unitary bridge and two split lens-holding rims of flexible non-metal material having front and rear faces, the ends of each lens-holding rim being provided with end pieces of substantially the same length and having oppositely disposed connecting faces of substantially the said same length, two hinges respectively corresponding to the two lens-holding rims and respectively connecting temples pivotally to the corresponding lens-holding rims, each hinge comprising three hinge members and a hinge pintle about which its hinge members are pivoted, two of the hinge members of each hinge being respectively mounted upon the rear faces only of the end pieces of the corresponding lens-holding rim adjacent to the respective oppositely disposed connecting faces, the third hinge members of the hinges being respectively mounted upon the rear faces of the temples, a concealing member secured to the front face of one of the end pieces of each lens-holding rim projecting beyond the connecting face of the said one end piece and integrally provided with a pin extending through the said one end piece and into the hinge member mounted thereon to secure the said hinge member to the rear face of the said one end piece, means securing to the rear face of the other end of each lens-holding rim the hinge members mounted thereon, and means securing the third hinge members of the hinges to the rear faces of the respective temples, the hinge pintle and the hinge members of each hinge cooperating to hold the end pieces of the corresponding lens-holding rim together with the oppositely disposed connecting faces thereof in contact with each other and with the concealing members concealing the splits in the lens-holding rims from the front when the end pieces are held together and to hold the temples to the respective lens-holding rims.

15. An ophthalmic mounting comprising a front and a pair of temples each having front and rear faces, the front having a unitary bridge and two split substantially planar lens-holding rims of flexible non-metal material having front and rear faces, the ends of each lens-holding rim being provided with end pieces of substantially the same length and substantially in the planes of the respective rims and having oppositely disposed connecting faces of substantially the said same length, two hinges respectively corresponding to the lens-holding rims and respectively connecting the temples pivotally to the corresponding lens-holding rims, each hinge comprising three hinge members and a hinge pintle about which its hinge members are pivoted, two of the hinge members of each hinge being respectively mounted upon the rear faces only of the end pieces of the corresponding lens-holding rim adjacent to the respective oppositely disposed connecting faces, the third hinge members of the hinges being respectively mounted upon the rear faces of the temples, a concealing member secured to the front face of one of the end pieces of each lens-holding rim projecting beyond the connecting face of the said one end piece and integrally provided with a pin extending through the said one end piece and into the hinge member mounted thereon to secure the said hinge member to the rear face of the said one end piece, means securing to the rear face of the other end piece of each lens-holding rim the hinge member mounted thereon, and means securing the third hinge members of the hinges to the rear faces of the respective temples, the hinge pintle and the hinge members of each hinge cooperating to hold the end pieces of the corresponding lens-holding rim together with the oppositely disposed connecting faces thereof in contact with each other and with the concealing members concealing the splits in the lens-holding rims from the front when the end pieces are held together and to hold the temples to the respective lens-holding rims.

16. An ophthalmic mounting comprising a front and a pair of temples each having front and rear faces, the front having a unitary bridge and two split lens-holding rims of flexible non-metal material having front and rear faces, the ends of each lens-holding rim being provided with rearwardly curved end pieces having oppositely disposed connecting faces, two hinges respectively corresponding to the lens-holding rims and respectively connecting the temples pivotally to the corresponding lens-holding rims, each hinge comprising three hinge members and a hinge pintle about which its hinge members are pivoted, two of the hinge members of each hinge being respectively mounted upon the rear faces only of the end pieces of the corresponding lens-holding rim adjacent to the respective oppositely disposed connecting faces, the third hinge members of the hinges being respectively mounted upon the rear faces of the temples, a concealing member secured to the front face of one of the end pieces of each lens-holding rim curved to conform to the curve of the said one end piece projecting beyond the connecting face of the said one end piece and integrally provided with a pin extending through the said one end piece into the hinge member mounted thereon to secure the said hinge member to the rear face of the said one end piece, means securing to the rear face of the other end piece of each lens-holding rim the hinge members mounted thereon, and means securing the third hinge members of the hinges to the rear faces of the respective temples, the hinge pintle and the hinge members of each hinge cooperating to hold the end pieces of the corresponding lens-holding rim together with the oppositely disposed connecting faces thereof in contact with each other and with the concealing members concealing the splits in the lens-holding rims from the front when the end pieces are held together and to hold the temples to the respective lens-holding rims.

17. An ophthalmic mounting comprising a split lens-holding rim of flexible non-metal material having front and rear faces and the ends of which are respectively provided with end pieces of substantially the same length and having oppositely disposed connecting faces of substantially the said same length; a temple having front and rear faces, a hinge pivotally connecting the lens-holding rim and the temple comprising three hinge members and a hinge pintle about which the hinge members are pivoted, two of the hinge members being respectively mounted upon the rear faces only of the end pieces adjacent to and flush with the respective oppositely disposed connecting faces, the third hinge member being mounted upon the rear face of the temple, a concealing member secured to and projecting forward beyond the front face of one of the end pieces and projecting beyond the connecting face of the said one piece and integrally provided with a pin extending through the said one end piece and into the hinge member mounted thereon to secure the said hinge member to the rear face of the said one end piece, means securing to the rear face of the other end piece the hinge member mounted thereon, and means securing the third hinge member to the rear face of the temple, the hinge pintle and the hinge members cooperating to hold the end pieces together with the oppositely disposed connecting faces in contact with each other and with the concealing member concealing the split in the lens-holding rim from the front when the end pieces are held together and to hold the temple to the lens-holding rim.

18. An ophthalmic mounting comprising a split lens-holding rim of flexible non-metal material having front and rear faces and the ends of which are respectively provided with end pieces of substantially the same length and having oppositely disposed connecting faces of substantially the said same length, the rear faces being provided with alined recesses L-shaped in cross-section respectively adjacent to the oppositely disposed connecting faces, a temple having a front face and a rear face provided with a recess L-shaped in cross-section near its ends, a hinge pivotally connecting the lens-holding rim and the temple comprising three hinge members and a hinge pintle about which the hinge members are pivoted, two of the hinge members being respectively mounted in the recesses only in the rear faces of the end pieces adjacent to and flush with the respective oppositely disposed connecting faces, the third hinge member being mounted in the recess of the temple, and a concealing member secured to and projecting forward beyond the front face of one of the end pieces and projecting beyond the connecting face of the said one end piece, the hinge pintle and the hinge members cooperating to hold the end pieces together with the oppositely disposed connecting faces in contact with each other and with the concealing member concealing the split in the lens-holding rim from the front when the end pieces are held together and to hold the temple to the lens-holding rim.

EUGENE D. DITTO.

REFERENCES CITED

The following references are of record in the file of this patent:

UNITED STATES PATENTS

| Number | Name | Date |
|---|---|---|
| 308,344 | Collins | Nov. 25, 1884 |
| 752,944 | Anderson | Feb. 23, 1904 |
| 1,022,653 | Boucher | Apr. 9, 1912 |
| 1,609,871 | Gage | Dec. 7, 1926 |
| 1,721,181 | Favre | July 16, 1929 |
| 2,281,812 | Uhlemann et al. | May 5, 1942 |
| 2,490,868 | Hansen | Dec. 13, 1949 |

FOREIGN PATENTS

| Number | Country | Date |
|---|---|---|
| 341,327 | Great Britain | Jan. 14, 1931 |
| 749,726 | France | May 8, 1933 |